Sept. 19, 1944.  S. G. TILDEN  2,358,483
BRAKE SHOE CLAMPING DEVICE
Filed Dec. 22, 1941
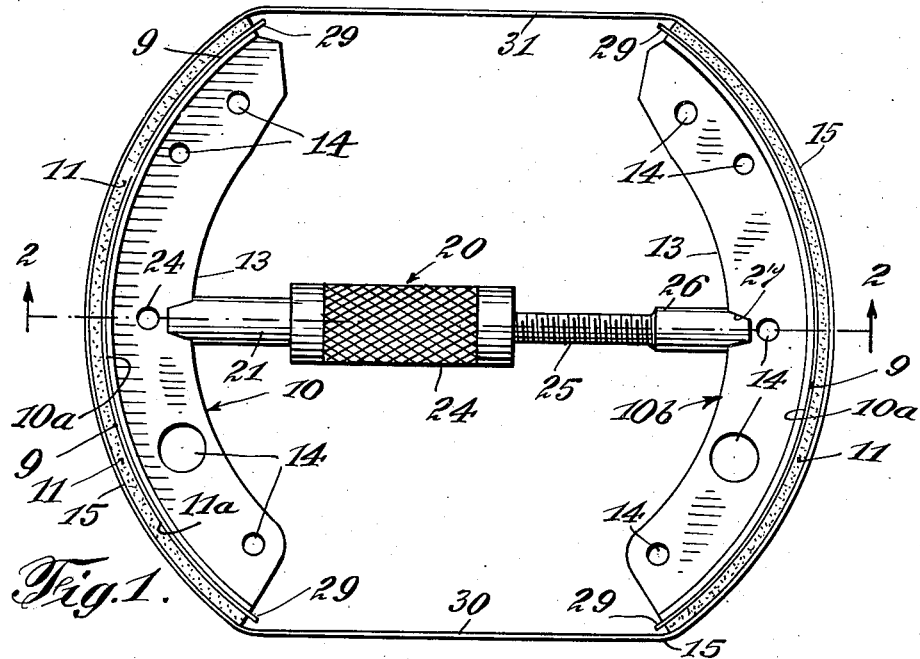
Fig. 1.
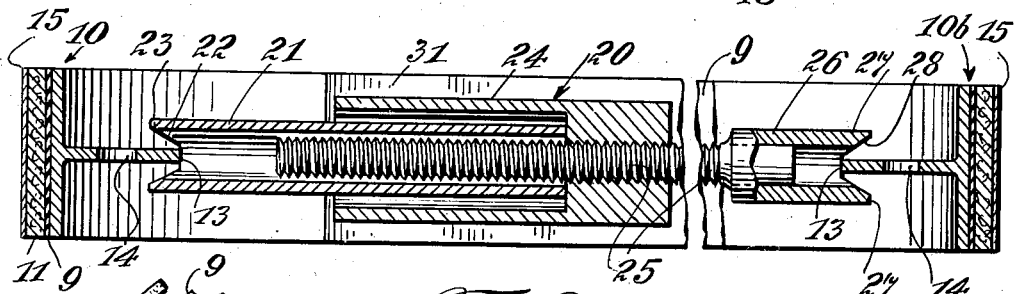
Fig. 2.
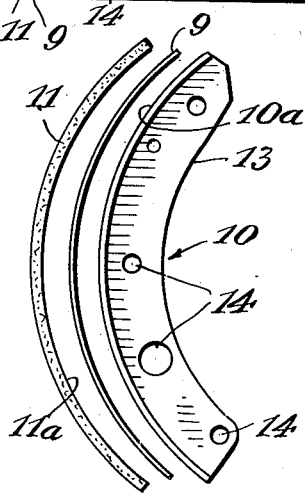
Fig. 3.
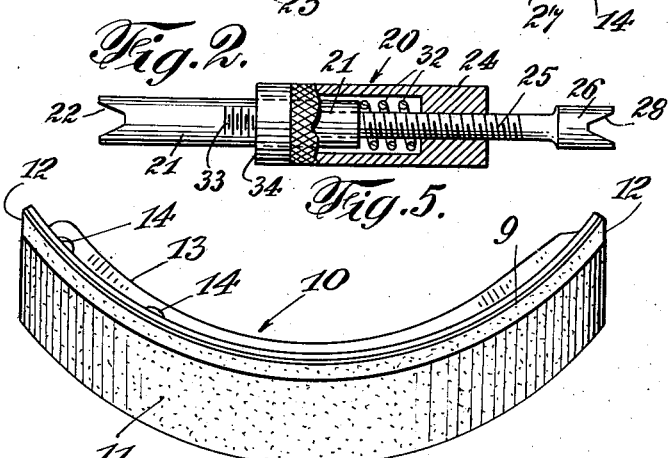
Fig. 5.
Fig. 4.
INVENTOR.
Sidney G. Tilden
BY C. P. Goepel
his ATTORNEY.

Patented Sept. 19, 1944

2,358,483

UNITED STATES PATENT OFFICE 2,358,483

BRAKE SHOE CLAMPING DEVICE

Sydney G. Tilden, Stewart Manor, N. Y.

Application December 22, 1941, Serial No. 423,907

4 Claims. (Cl. 154—1)

This invention relates to automobile brakes and more particularly to brake-shoes thereof. The invention has for its object to provide a brake-shoe to which a brake lining or segment has been secured by a thermo setting adhesive and without the aid of rivets.

It has heretofore been proposed to bond a friction material segment to a brake shoe by means of a thermo-setting compound interposed between segment and brake shoe and clamping the segment and brake shoe together while heating the whole to a proper temperature and for the time necessary to bring about polymerization of the thermosetting compound.

Difficulties have been encountered in constructing a clamping device for holding these parts together with sufficient and evenly distributed pressure during the time they are to be subjected to heat and the thermosetting compound cured, and it has been especially difficult to construct a clamping device having the aforesaid characteristics that is readily adaptable to the various lengths, widths, curvatures and design of brake shoes of different manufacture.

The present invention has for its object to provide a clamping means which is simple and comparatively cheap to construct, quick and easy to use, and universally adaptable to various brake shoes; one which exerts a suitable and evenly distributed pressure upon the intermediate layer between the brake segment and the brake shoe; and one which permits the brake shoe to be readily released after the curing process has been completed.

More particularly, the invention consists in an extendable member disposed between two complementary brake shoes with the friction material segments and thermosetting adhesive compound layer in place between the segments and the shoes, set within an enclosing metallic ring, the extendable member serving to force the brake shoes and segments radially outward against a non-extendable metallic ring.

The invention consists further in certain features described hereinafter and an embodiment of the invention is shown in the accompanying drawing, and the invention itself will be claimed in the claims appended hereto.

In the accompanying drawing—

Fig. 1 is a side view of an embodiment of the invention as applied to two brake shoes, showing the same about one-third the actual size;

Fig. 2 is a horizontal section on line 2—2 of Fig. 1, being in about one-half size;

Fig. 3 is a side view showing the brake shoe, the intermediate adhesive coated tie-ply and the friction material segment separated from each other, in about one-quarter of the original size;

Fig. 4 is a perspective view of the finished brake shoe, having the friction material segment securely attached thereto, and Fig. 5 is a detail view of a modified form of structure.

Similar characters of reference indicate corresponding parts throughout the various views.

Referring to the drawing, and more particularly to Fig. 3, there is shown a brake shoe 10, a facing of friction material 11, and a thermo-setting adhesive compound layer in the form of a thin tape tie-ply 9 interposed between the outer cylindrical surface 10a of the brake shoe 10 and the inside cylindrical surface 11a of the segment 11. After the outside cylindrical surface 10a of the brake shoe has been properly conditioned by removing all rust, scale and foreign matter by means of a sand blast or abrasive wheel, the shoe 10 and segment 11 are positioned as shown in Fig. 3, with the adhesive strip 9 adjacent to the outside cylindrical surface 10a of the brake shoe 10 and with the inside cylindrical surface 11a of the segment 11 next adjacent.

Similar parts are positioned as shown in Fig. 1 with another or complementary brake shoe 10b, the two brake shoes being placed in juxtaposition so that their outside cylindrical surfaces are disposed away from each other. A continuous ring 15, which has a width approximately corresponding to the width of the segment 11 as shown in Fig. 2 and which has a circumferential length approximately equal to the circumference of the full circle of which the brake shoe is an arc as shown in Fig. 1, is placed around the positioned brake shoes and segments so as to completely encircle them. The ring 15 is preferably made of sheet steel which must have sufficient tensile strength to resist extension and suitable flexibility to allow it to exactly conform to the curvature and length of the brake shoes 10 and 10b. With these parts in position within the continuous metallic ring 15, the interior edges of flanges 13 of the brake shoes 10 and 10b are then engaged by an adjustable extension member or screw jack 20.

The adjustable extension member or screw jack 20 consists essentially of a sleeve 21 having a forked portion 22 to enable the lips 23 to straddle the flange 13 of the brake shoe 10. This sleeve is within and butts against a knurled hand-nut 24 which has a female screw thread engaging a male threaded spindle 25 which has one end thereof provided with an enlarged portion 26 having lips 27 forming a forked portion 28, which lips 27 serve to straddle the flange 13 of the brake shoe 10b in a manner similar to the forked end 22 of the sleeve 21. By rotating the knurled hand-nut 24 in one direction, the forked ends 22 and 28 are moved away from each other and by this movement the brake shoes are forced apart and against the enclosing metallic ring 15 which is not expanded by such force and causes the friction material segments 11 to be pressed against the outside cylindrical surfaces 10a of the brake shoes 10 and 10b with the thermosetting adhesive 9 interposed between.

It will be noted from Fig. 1 that the flexible metallic ring 15 has adapted itself under the force of the extending member or screw jack 20 to the curvature of the brake shoes 10 and 10b, exerting a reasonably uniform resisting pressure over the entire area of the friction material segments 11. Those portions of the ring 30 and 31 which lie between the two brake shoes 10 and 10b will tend to straighten out under the force of the screw jack 20 and the ring is purposely made flexible to permit this conformation, so that the molecular structure of the steel ring is stressed in tension only.

It is not necessary that the flexible metallic ring be of the same width as the segment which is to be bonded to the brake shoe. The ring may be of any width greater than the segment width without reducing its effectiveness, and may also be somewhat narrower than the segment since the segment material has sufficient inherent rigidity to convey sufficient pressure to its edges extending beyond the ring.

The screw jack 20 may be modified slightly in design as shown in Fig. 5 by placing a compression spring 32 between the sleeve 21 and the knurled hand-nut 24. An index 33 on the sleeve 21, where it extends from the end 34 of the hand-nut 24, serves as a marking device. By pre-calibrating the spring 32 against the index 33, any desired predetermined force may be exerted by the ends 22 and 28 of the screw jack 20 against the brake shoes 10 and 10b, shown in Fig. 1. The hand-nut 24 is adjusted to secure a corresponding compression of the spring 32 as measured on the index 33 of the sleeve 21 by the edge 34 of the hand-nut 24, uncovering or opening to view the lines of the index. The spring 32 serves also a secondary function in maintaining a force to keep the brake shoes pressed against the enclosing ring 15 despite a reduction in the thickness of the layers of thermosetting compound 9 (Fig. 2) due to the compound squeezing out from between shoe and segment as it liquefies during polymerization. However, it has been found by actual tests of the clamping device shown in Fig. 1, that without the compression spring number 32 the force exerted by the screw jack 20 on the shoes 10 and 10b may be satisfactorily judged by the torque applied through the hand to tighten the hand-nut 24 and expand the brake shoes 10 and 10b against the metallic enclosing ring 15, and that there is enough strain in the ring 15, the brake shoes 10 and 10b, and the screw jack 20 to take up and compensate for the slight reduction in the thickness of the intermediate layers of thermosetting compound 9 as the compound polymerizes, and that the clamping device without incorporating the compression spring 32 in the screw jack 20 is a wholly satisfactory and practical tool.

With the parts assembled as shown in Figs. 1 and 2, the entire assembly is then placed into a suitable oven heated by electricity, gas or other means and the thermosetting bonding compound subjected to the action of the heat therein. The assembly may be heated without the use of an oven by electrical resistance or induction or by other means. The heat acting upon the thermosetting bonding compound brings about, by the chemical process known as polymerization, an insoluble and infusable bond of the friction material segments 11 to the outside cylindrical surfaces of the brake shoes 10 and 10b. After polymerization of the bonding compound has been completed, the assembly is removed from the oven and permitted to cool, after which the hand-nut 24 is rotated in reverse direction, moving the forked ends 22 and 28 toward each other and the extension tool or screw jack 20 is then removed from the brake shoes 10 and 10b, which are in turn removed from the metallic enclosing ring 15. Each brake shoe has thus been completely faced.

It will be noted that in Fig. 1, the tie-ply tape extends somewhat beyond the brake shoe, as indicated by 29. This may be cut off and the ends of the friction material segment beveled as shown at 12 in Fig. 4 to produce a finished article as shown in Fig. 4 with the friction material segment securely attached to the outer cylindrical surface of the brake shoes.

The tie-ply tape 9 coated or impregnated with the adhesive may be of various forms; one form would be rubber-bonded asbestos tape coated with a thermosetting resinoid. Other forms of a tie-ply tape may be used, or the shoes or friction material segments or both may be coated with a resinoid in liquid or paste form, since the invention is not in the bonding compound but in the disclosed means for clamping the assembled parts in position during the heating operation and exerting a sufficient and evenly distributed pressure to bring about adhesion after polymerization of the bonding compound. The particular means described is self-adjusting to all types, sizes and curvatures of internal brake shoes within the limits of the circumferential length of the enclosing ring and the extendability of the screw jack.

I have described an embodiment of my invention, but changes may be made therein without departing from the spirit of the invention as defined in the appended claims.

I claim as new:

1. In a device for clamping friction material segments to brake shoes, the combination of an endless enclosing member of flexible material, non-extensible under stress as used, adapted to encircle a set of brake shoes and friction material segments in normal juxtaposition and means for moving the brake shoes against the said friction material segments while the segments are constrained by the said enclosing member, said means including two oppositely disposed forked members for engaging the said brake shoes, one of said forked members being formed as a sleeve at its inner end and the other of said forked members being formed as a threaded rod at its inner end freely slidable in said sleeve, and an adjusting member having a sleeve portion encircling the inner end of said first-named forked member and terminating in a reduced threaded bore portion in threaded engagement with the inner end of said second-named forked member and in abutting engagement with the inner end of said first-named forked member.

2. In a device for clamping friction material segments to brake shoes, the combination of an endless enclosing member of a flexible material, non-extensible under stress as used, adapted to encircle a set of brake shoes and friction material segments in normal juxtaposition and means for expanding the brake shoes against the said friction material segments while the segments are constrained by the said enclosing member, said means including forked members for engaging the said brake shoes, screw-threaded connection between the said forked members, and means for adjustment of the said connection, whereby the pressure between the said brake shoes and the said friction material segments is established and may be varied through adjustment of the said screw-threaded connection.

3. In a device for clamping friction material segments to brake shoes, the combination of an endless enclosing member of flexible material, non-extensible under stress as used, adapted to encircle a set of brake shoes and friction material segments in normal juxtaposition and means for moving the brake shoes against the said friction material segments while the segments are constrained by the said enclosing member, said means including forked members for engaging the said brake shoes, screw-threaded connection between the said forked members, a calibrated compression spring disposed between said screw-threaded connection and the said forked member, and an index whereon is indicated the extent of compression of the said spring.

4. In a device for clamping friction material segments to brake shoes, the combination of an endless enclosing member of flexible material, non-extensible under stress as used, adapted to encircle a set of brake shoes and friction material segments in normal juxtaposition and means for moving the brake shoes against the said friction material segments while the segments are constrained by the said enclosing member, said means including forked members for engaging the brake shoes, screw-threaded connection between the said forked members, means for adjustment of the said connection, a calibrated compression spring disposed between the said screw-threaded connection and the said forked member, and an index whereon is indicated the extent of compression of the said spring, whereby the pressure between the said brake shoes and the said friction material segments is established through compression of the said spring and may be varied by adjustment of the said screw-threaded means, the extent of compression of the said spring being indicated on the index.

SYDNEY G. TILDEN.